UNITED STATES PATENT OFFICE.

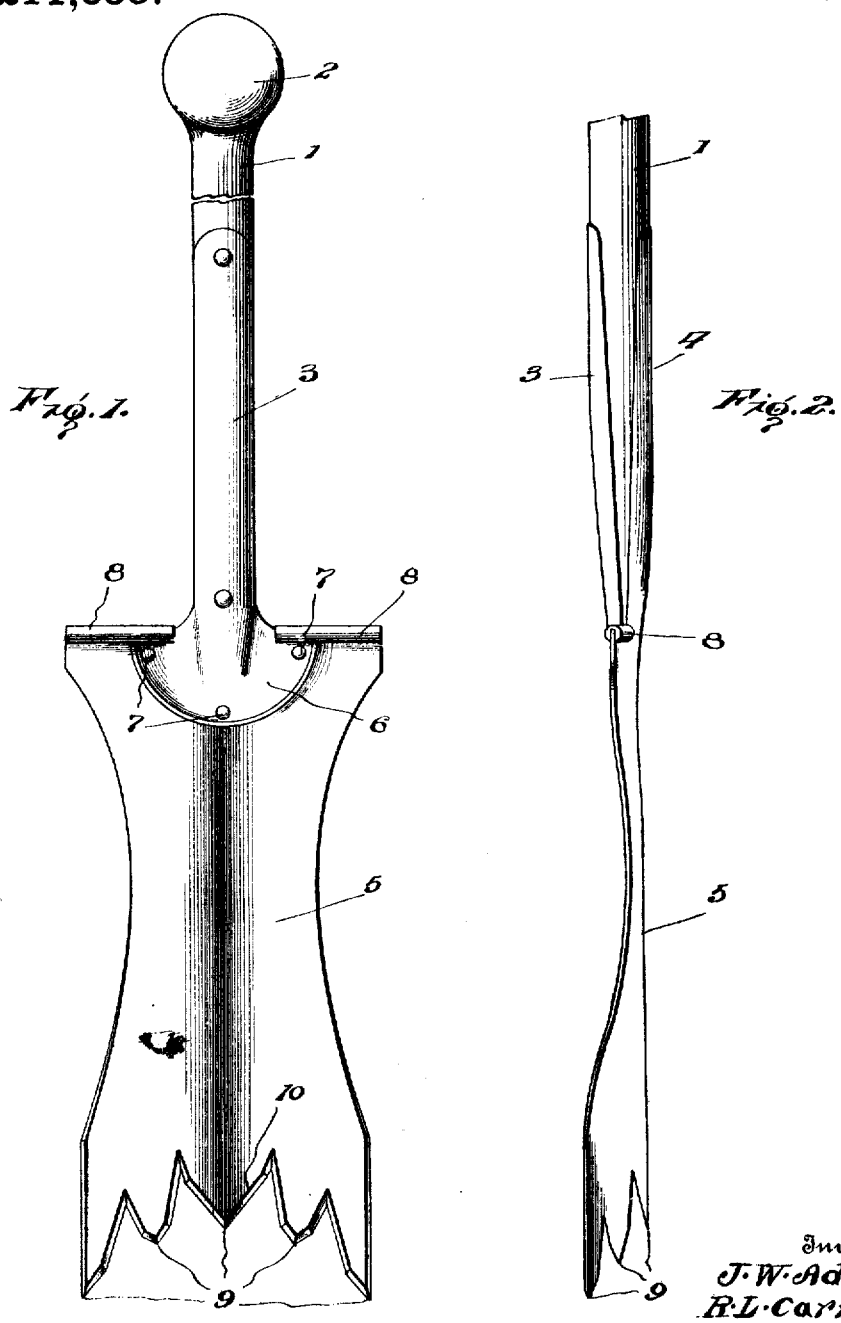

JOSEPH W. ADAMS AND ROBERT L. CARRICK, OF LEXINGTON, KENTUCKY.

ROOT-CUTTER.

1,211,655.     Specification of Letters Patent.     Patented Jan. 9, 1917.

Application filed May 23, 1916. Serial No. 99,426.

*To all whom it may concern:*

Be it known that we, JOSEPH W. ADAMS and ROBERT L. CARRICK, citizens of the United States, residing at Lexington, in the county of Fayette and State of Kentucky, have invented certain new and useful Improvements in Root-Cutters, of which the following is a specification.

This invention relates to agricultural implements and has for its object the provision of a tool especially adapted for cutting the roots of tobacco plants so that the plants may "yellow" in the field before harvesting, thereby cutting off the flow of sap and decreasing the weight to be handled and housed and insuring the plant against a second growth.

The invention seeks to provide a tool for the stated purpose which may be light in weight and easily handled and which will be strong, durable and efficient.

The invention is illustrated in the accompanying drawings and consists in certain novel features which will be particularly pointed out in the claim following a detailed description.

In the drawings,—Figure 1 is a front view of the improved tool; and Fig. 2 is an edge view of the same.

The handle 1 will conveniently be a wooden stick or rod of proper length to be easily manipulated by the operator and will preferably be formed with a spherical knob or enlargement 2 at its upper end so that it will fit readily to the hand. The lower end of the handle is slightly tapered to fit within and be secured to front and rear plates or tangs 3 and 4, the tang 4 being formed integral with the upper end of a blade 5 while the lower end of the tang 3 is flattened and enlarged, as shown at 6, to fit against the front face of the blade at the upper end of the same and be rigidly secured thereto by rivets or similar fastenings 7. The upper edge or end of the blade 5 will project laterally from the opposite sides of the handle so as to form convenient rests upon which the foot of the operator may be placed to aid in forcing the blade into the ground and to reinforce the said upper end and also reduce the wear upon the shoe of the operator, beads or guards 8 are fitted upon the said upper edges, as clearly shown. These guards will provide an extended surface against which the foot of the operator may be pressed and they will preferably be of a circular cross sectional form, so as to eliminate all angles or sharp corners which would cut into the shoe. The blade 5 is dished or curved in cross section, as will be readily understood on reference to Fig. 2, so that it will present a concave front face which may fit close to the stalk of the plant without injuring the same and the lower edge or end of the blade is arched, as shown in Fig. 1, and constructed with a plurality of teeth 9 which are disposed to readily penetrate the ground and pass at opposite sides of the root branches. The edges of the teeth are beveled, as shown at 10, so that they will present cutting surfaces which will readily sever the roots and thereby accomplish the desired end.

The manner of using the device is thought to be obvious and it will be readily noted that the tool is exceedingly simple in construction and may be easily handled by any operator. By forming the lower end or edge of the blade with a plurality of teeth, a number of entering points are furnished so that the blade will readily cut into the dirt and as the side edges of the teeth converge they will readily cut through the roots laterally with a shearing action so that a great amount of force will not be needed to sever the roots. The arched form of the lower edge of the blade permits it to conform to the hill in which the plant is growing so that it will enter the ground without pushing aside or otherwise disturbing the soil to such an extent as to remove from the plant the necessary support.

Having thus described the invention, what is claimed as new is:

A tool for the purpose set forth comprising a handle, a blade of arcuate cross sectional form having an arched lower end provided with a plurality of teeth, the upper end of the blade being formed with a central tang fitting against the back of the handle and secured thereto, a tang secured to the front side of the handle and having its lower end expanded and secured against the concave face of the blade, and beads secured on the upper end of the blade at the sides of the handle.

In testimony whereof, we affix our signatures.

JOSEPH W. ADAMS. [L. S.]
ROBERT L. CARRICK. [L. S.]

Copies of this patent may be obtained for five cents each, by addressing the "Commissioner of Patents, Washington, D. C."